United States Patent [19]

Sugiyama

[11] Patent Number: 4,734,312
[45] Date of Patent: Mar. 29, 1988

[54] PROTECTIVE COVERING FOR AUTOMOBILE BODIES

[75] Inventor: Shinpei Sugiyama, Suzuka, Japan
[73] Assignee: Honda Giken Kogyo Kabushiki Kaisha, Tokyo, Japan
[21] Appl. No.: 872,246
[22] Filed: Jun. 9, 1986
[51] Int. Cl.$^4$ ................................................. B32B 3/26
[52] U.S. Cl. ................................. 428/157; 150/52 K; 428/159; 428/161; 428/319.7
[58] Field of Search ................ 428/33, 157, 159, 160, 428/316.6, 319.3, 319.7, 319.9, 44, 45, 47, 48, 51, 57, 58, 81, 161, 162; 150/52 K, 52 R; 280/762, 770; 293/109; 296/193, 197, 198

[56] References Cited

U.S. PATENT DOCUMENTS 4,288,490  9/1981  Alfter et al. ..................... 428/316.6
4,453,357  6/1984  Zwilgmeyer ..................... 428/317.7

Primary Examiner—William J. Van Balen
Attorney, Agent, or Firm—Burgess, Ryan and Wayne

[57] ABSTRACT

A protective covering suitable for protecting the surface of an automobile against being injured owing to contact with a hard object during the assembling work or servicing in factories or maintenance shops, is disclosed which comprises a lamination of an outer thin flexible layer of engineering or semi-rigid plastic and a lining of elastic foamed plastic material, preferably shaped to conform to the contour of the body surface area to which it is applied for protection. Preferably, the covering has an engaging lug properly formed along an upper edge and at least part of a side thereof for engaging a seam or raised part of the applied area so that the covering has firm grip onto the surface, without accidentally coming off.

4 Claims, 2 Drawing Figures

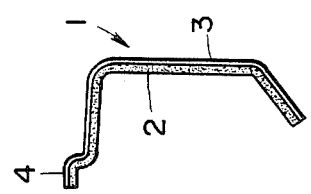
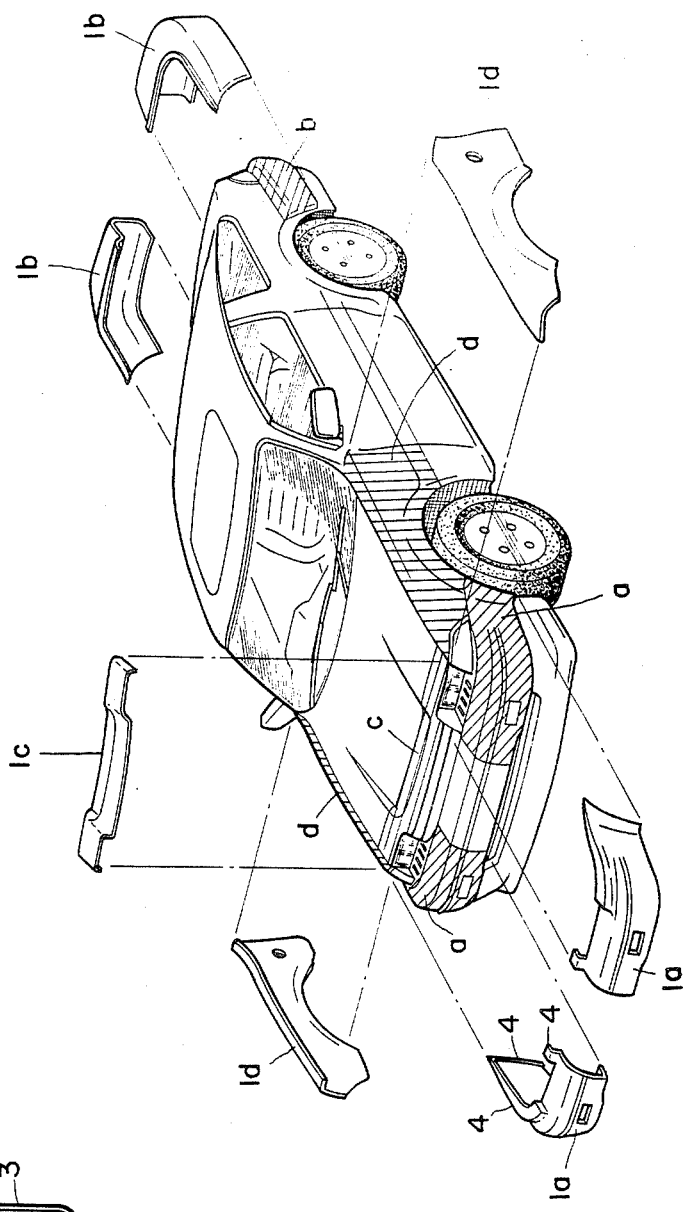

PROTECTIVE COVERING FOR AUTOMOBILE BODIES

BACKGROUND OF THE INVENTION

1. Field of the Invention

The present invention relates to a protective covering suitably used for protecting the body of an automobile from being hurt during the work in factory assembly lines.

2. Description of the Prior Art

Since various tools and metal parts are handled in automotive factories or maintenance shops, assembling or servicing work exposes an automobile to the hazard of incurring flaws in its body surface or coating due to accidental contact with a hard object.

Conventionally, during such work, automobile bodies have been covered with nylon protective cloths lined with a permanent magnet so that the cloth sticks to the metallic surface by magnetic attraction.

However, these prior art protective cloths have been found to pose various problems. First, they would easily come off from place at the touch of a worker's hand. Secondly, iron powder or fine metal chippings undetectably left stuck in the magnetic lining tended to cause scratching to the body surface where they were applied. The problem becomes more serious if such scratching occurs to a delicate area, such as a synthetic resin bumper, where repair is very costly or impossible.

SUMMARY OF THE INVENTION

The present invention contemplates to eliminate the above-mentioned various drawbacks of the conventional protective cloths.

It is, therefore, an object of the present invention to provide a protective covering used for protecting the body of an automobile during factory work which can be firmly held in applied place.

Another object of the present invention is to provide such a covering which is simple and can readily be handled.

BRIEF DESCRIPTION OF THE DRAWING

FIG. 1 is a cross-sectional view of a preferred embodiment of the protective covering constructed in accordance with the present invention; and FIG. 2 is a perspective view of various modifications of the covering as it is applied to the body surface of an automobile.

DESCRIPTION OF THE PREFERRED EMBODIMENTS

Referring to the drawings, a protective covering 1 according to a preferred embodiment of this invention may comprise a lamination of an outer thin flexible layer 3 made of engineering or semi-rigid plastic material such as polypropylene and an impact resistant, chemical-proof lining 2 of foamed synthetic resin material such as polypropylene.

The protective covering 1 of this invention may preferably be shaped properly so that it can be fittingly applied to the area of an automobile body surface to be protected during the factory work, such as a front bumper a, rear bumper b, bonnet front area c and wheel house d, shown in shade in FIG. 2.

In FIG. 2, the protective covering 1 is split up into four places 1a, 1b, 1c, and 1d, each configured in its lining 2 to conform to the contour of the particular local body surface area to which it is applied, with an engaging lug 4 formed along an upper edge and at least part of a side thereof for engaging with the seam or ridge in the applied area so that the covering 1 holds a firm grip onto the area, without coming off therefrom.

These pieces of protective covering 1 are very easy to handle. For example, the covering 1a may be held against the front bumper a and its upper part of the engaging lug 4 is manipulated to take hold along the seam between the front bumper a and bonnet front area c, with the side part of the engaging lug 4 being engaged along the rear bumper edge, allowing the foamed synthetic resin lining 2 to be elastically contacted with the bumper surface. Thus, the protective covering of this invention is very effective to reduce the possibility of causing flaws in the surface of an automobile owing to accidental contact with hard objects during the factory work.

What is claimed is:

1. A protective covering for protecting the surface of an automobile body during factory work, comprising a body portion made from a thin flexible material and shaped to conform to the contour of the surface to which it is applied for protection, a lining portion made from a foamed elastic material and adhered to the inside of said body portion, said lining portion forming an inner exposed surface of said protective covering, and an engaging lug formed integrally with part of the edges of said body portion and provided to engage with a convenient end portion of the surface.

2. A protective covering as set forth in claim 1, wherein said body portion is shaped to conform to the contour of a wheel house of an automobile.

3. A protective covering as set forth in claim 1, wherein said body portion is shaped to conform to the contour of a bumper of an automobile.

4. A protective covering as set forth in claim 1, wherein said body portion is shaped to conform to the contour of a bonnet of an automobile.

* * * * *